United States Patent
Yang et al.

(10) Patent No.: US 12,230,753 B2
(45) Date of Patent: Feb. 18, 2025

(54) ELECTROLYTE FOR ELECTROCHEMICAL CELLS WITH A SILICON-CONTAINING ELECTRODE

(71) Applicant: GM GLOBAL TECHNOLOGY OPERATIONS LLC, Detroit, MI (US)

(72) Inventors: Xingyi Yang, Sterling Heights, MI (US); Michael P. Balogh, Novi, MI (US); Xingcheng Xiao, Troy, MI (US); Joel G. Toner, Imlay City, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 17/158,751

(22) Filed: Jan. 26, 2021

(65) Prior Publication Data

US 2022/0238911 A1    Jul. 28, 2022

(51) Int. Cl.
*H01M 10/0562* (2010.01)
*H01M 4/02* (2006.01)
*H01M 4/38* (2006.01)
*H01M 4/505* (2010.01)
*H01M 4/525* (2010.01)
*H01M 4/62* (2006.01)

(52) U.S. Cl.
CPC ....... *H01M 10/0562* (2013.01); *H01M 4/386* (2013.01); *H01M 4/505* (2013.01); *H01M 4/525* (2013.01); *H01M 4/625* (2013.01); *H01M 2004/027* (2013.01); *H01M 2004/028* (2013.01); *H01M 2220/20* (2013.01); *H01M 2300/008* (2013.01)

(58) Field of Classification Search
CPC .. H01M 10/0562; H01M 4/386; H01M 4/505; H01M 4/525; H01M 4/625; H01M 2004/027; H01M 2004/028; H01M 2220/20; H01M 2300/008
See application file for complete search history.

(56) References Cited

U.S. PATENT DOCUMENTS

| | | | |
|---|---|---|---|
| 8,440,350 | B1 | 5/2013 | Verbrugge et al. |
| 8,859,144 | B2 | 10/2014 | Xiao |
| 8,999,584 | B2 | 4/2015 | Jiang et al. |

(Continued)

FOREIGN PATENT DOCUMENTS

| | | | |
|---|---|---|---|
| CN | 113054246 A | * | 6/2021 |
| CN | 114792844 A | | 7/2022 |
| DE | 102021130249 A1 | | 7/2022 |

OTHER PUBLICATIONS

You et al., CN 113054246 A; Espacenet machine translation, 2021 (Year: 2021).*

(Continued)

*Primary Examiner* — Adam A Arciero
(74) *Attorney, Agent, or Firm* — Harness, Dickey & Pierce, P.L.C.

(57) ABSTRACT

An electrolyte composition for electrochemical cells including a silicon-containing electrode is provided herein as well as electrochemical cells including the electrolyte composition. The electrolyte composition includes a lithium salt, fluoroethylene carbonate (FEC), a linear carbonate, vinylene carbonate, and a fluorosilane additive. The FEC and the linear carbonate are present in the electrolyte composition in a ratio of about 1:3 v/v to about 1:9 v/v.

11 Claims, 6 Drawing Sheets

(56) References Cited

U.S. PATENT DOCUMENTS

| | | | |
|---|---|---|---|
| 9,005,811 B2 | 4/2015 | Xiao et al. | |
| 9,093,705 B2 | 7/2015 | Xiao et al. | |
| 9,142,830 B2 | 9/2015 | Xiao et al. | |
| 9,302,914 B2 | 4/2016 | Liu et al. | |
| 9,362,551 B2 | 6/2016 | Sachdev et al. | |
| 9,379,374 B2 | 6/2016 | Liu et al. | |
| 9,531,004 B2 | 12/2016 | Xiao et al. | |
| 9,564,639 B2 | 2/2017 | Huang | |
| 9,570,752 B2 | 2/2017 | Huang et al. | |
| 9,577,251 B2 | 2/2017 | Xiao et al. | |
| 9,780,361 B2 | 10/2017 | Xiao et al. | |
| 10,062,898 B2 | 8/2018 | Xiao | |
| 10,164,245 B2 | 12/2018 | Huang | |
| 2008/0241647 A1* | 10/2008 | Fukui | H01M 4/525 29/623.5 |
| 2012/0202122 A1* | 8/2012 | Han | H01M 10/0567 429/188 |
| 2013/0177822 A1* | 7/2013 | Taki | H01M 4/5825 429/324 |
| 2017/0373349 A1* | 12/2017 | Braeunling | H01M 10/0569 |
| 2018/0205114 A1 | 7/2018 | Pauric et al. | |
| 2020/0020948 A1 | 1/2020 | Huang et al. | |
| 2020/0020949 A1 | 1/2020 | Huang | |
| 2020/0119339 A1 | 4/2020 | Halalay et al. | |
| 2020/0127292 A1 | 4/2020 | Halalay et al. | |
| 2020/0220153 A1 | 7/2020 | Xiao et al. | |

OTHER PUBLICATIONS

Yang, Li et al, "Evaluation of Electrolytes for Si-Based Negative Electrodes," ECS Meeting Abstracts (2017), MA2017-01, 254; DOI: 10.1149/MA2017-01/3/254, 2 pages.

* cited by examiner

ELECTROLYTE FOR ELECTROCHEMICAL CELLS WITH A SILICON-CONTAINING ELECTRODE

FIELD

The present disclosure relates to electrolyte compositions for electrochemical cells with a silicon-containing electrode and electrochemical cells including the electrolyte composition.

BACKGROUND

This section provides background information related to the present disclosure which is not necessarily prior art.

High-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a cathode), a second electrode of opposite polarity (e.g., an anode), an electrolyte material, and a separator. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid, semi-solid or liquid form. Lithium ions move from a cathode (positive electrode) to an anode (negative electrode) during charging of the battery, and in the opposite direction when discharging the battery. For convenience, a negative electrode will be used synonymously with an anode, although as recognized by those of skill in the art, during certain phases of lithium ion cycling the anode function may be associated with the positive electrode rather than negative electrode (e.g., the negative electrode may be an anode on discharge and a cathode on charge).

In various aspects, an electrode includes an electroactive material. Negative electrodes typically comprise such an electroactive material that is capable of functioning as a lithium host material serving as a negative terminal of a lithium ion battery. Conventional negative electrodes include the electroactive lithium host material and optionally another electrically conductive material, such as carbon black particles, as well as one or more polymeric binder materials to hold the lithium host material and electrically conductive particles together.

Typical electroactive materials for forming a negative electrode (e.g., an anode) in a lithium ion electrochemical cell include lithium-graphite intercalation compounds, lithium-silicon alloys, lithium-tin compounds, and other lithium alloys. While graphite compounds are most common, recently, anode materials with high specific capacity (in comparison with conventional graphite) are of growing interest. For example, silicon has one of the highest known theoretical capacities for lithium, making it one of the most attractive alternatives to graphite as a negative electrode material for rechargeable lithium ion batteries. However, current silicon anode materials suffer from significant drawbacks. For example, silicon-containing materials experience large volume changes (e.g., volume expansion/contraction) during lithium insertion/extraction (e.g., intercalation and deintercalation). Moreover, the initial lithiation process of silicon-based electroactive materials can promote an increase in surface roughness. Further, additional volumetric changes may occur during successive charging and discharging cycles for silicon electroactive materials. Such volumetric changes can lead to fatigue cracking and decrepitation of the electroactive material. This may potentially lead to a loss of electrical contact between the silicon-containing electroactive material and the rest of the battery cell as well as the consumption of electrolyte to form new solid electrolyte interface (SEI), resulting in a decline of electrochemical cyclic performance, diminished Coulombic charge capacity retention (capacity fade), and limited cycle life.

Additionally, gases can be generated during cycling of silicon-containing electrochemical cells with electrolytes including fluoroethylene carbonate (FEC). These gases can pose safety concerns and diminish cycle life in silicon-containing electrochemical cells, in particular in pouch cells.

It would be desirable to develop electrolytes for electrochemical cells, particularly including an electrode comprising silicon, for use in high energy and high power lithium ion batteries, which overcome the current shortcomings that prevent their widespread commercial use. Accordingly, it would be desirable to develop electrolytes for use in electrochemical cells with an electrode comprising silicon or other electroactive materials that undergo significant volumetric changes during lithium ion cycling that are capable of minimal gas production and minimal capacity fade and maximized charge capacity in commercial lithium ion batteries with long lifespans. For long term and effective use, high specific capacity electrode materials, such as silicon, should be capable of minimal capacity fade and maximized charge capacity for long-term use in lithium ion batteries.

SUMMARY

This section provides a general summary of the disclosure and is not a comprehensive disclosure of its full scope or all of its features.

In certain aspects, the present disclosure provides an electrolyte composition for an electrochemical cell. The electrolyte composition includes a lithium salt, fluoroethylene carbonate (FEC), a linear carbonate, vinylene carbonate, and a fluorosilane additive. The FEC and the linear carbonate can be present in a ratio of about 1:3 v/v to about 1:9 v/v. The fluorosilane additive corresponds in structure to Formula I:

wherein R can be a polar aprotic group and x can be 1-20.

The FEC may be present in an amount of about 10 wt % to about 30 wt %, based on total weight of the electrolyte composition, and the vinylene carbonate may be present in amount of about 50 wt % to about 80 wt %, based on total weight of the electrolyte composition.

The fluorosilane additive and the vinylene carbonate may each be present in an amount of about 1 wt % to about 5 wt %, based on total weight of the electrolyte composition.

The lithium salt can be selected from the group consisting of lithium hexafluorophosphate (LiPF$_6$), lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB(C$_2$O$_4$)$_2$) (LiBOB), lithium difluorooxalatoborate (LiBF$_2$ ($C_2O_4$)), lithium hexafluoroarsenate (LiAsF$_6$), lithium trifluoromethanesulfonate (LiCF$_3$SO$_3$), lithium bis(trifluoromethane)sulfonylimide (LiN(CF$_3$SO$_2$)$_2$), lithium bis(fluorosulfonyl)imide (LiN(FSO$_2$)$_2$) (LiSFI), and a combination thereof.

The linear carbonate can be selected from the group consisting of dimethyl carbonate (DMC), diethyl carbonate (DEC), ethylmethylcarbonate (EMC), and a combination thereof.

In Formula (I), R can be selected from the group consisting of a nitrile, methoxy, methyl methyacrylate, methyl sulfoxide, methyl formamide, acetyl, and acetoxy; and x can be 1-5.

The fluorosilane additive can be selected from the group consisting of (3-cyanopropyl)dimethylfluorosilane, (2-cyanoethyl)dimethylfluorosilane, (4-cyanobutyl)dimethylfluorosilane, and a combination thereof.

In the electrolyte composition, ethylene carbonate (EC) may not be present.

In yet other aspects, the present disclosure provides an electrochemical cell. The electrochemical cell includes a negative electrode including a first electroactive material comprising silicon and a positive electrode including a second electroactive material. The positive electrode can be spaced apart from the negative electrode and a porous separator can be disposed between confronting surfaces of the negative electrode and the positive electrode. The electrochemical cell further includes an electrolyte infiltrating one or more of: the negative electrode, the positive electrode, and the porous separator. The liquid electrolyte includes a lithium salt, fluoroethylene carbonate (FEC), a linear carbonate, vinylene carbonate, and a fluorosilane additive. The FEC and the linear carbonate can be present in a ratio of about 1:3 v/v to about 1:9 v/v. The fluorosilane additive corresponds in structure to Formula I:

(I)

wherein R can be a polar aprotic group and x can be 1-20.

The first electroactive material includes silicon-containing particles having an average particle diameter of greater than or equal to about 1 μm. The silicon-containing particles can include silicon, carbon coated silicon, a silicon oxide, a lithium silicon alloy, a silicon tin alloy, a silicon iron alloy, a silicon aluminum alloy, a silicon cobalt alloy, or a combination thereof.

The FEC can be present in an amount of about 10 wt % to about 30 wt %, based on total weight of the electrolyte, and the vinylene carbonate is present in amount of about 50 wt % to about 80 wt %, based on total weight of the electrolyte.

The fluorosilane additive and the vinylene carbonate can each be present in an amount of about 1 wt % to about 5 wt %, based on total weight of the electrolyte.

The lithium salt can be selected from the group consisting of lithium hexafluorophosphate (LiPF$_6$), lithium perchlorate (LiClO$_4$), lithium tetrachloroaluminate (LiAlCl$_4$), lithium iodide (LiI), lithium bromide (LiBr), lithium thiocyanate (LiSCN), lithium tetrafluoroborate (LiBF$_4$), lithium tetraphenylborate (LiB(C$_6$H$_5$)$_4$), lithium bis(oxalato)borate (LiB($C_2O_4$)$_2$) (LiBOB), lithium difluorooxalatoborate (LiBF$_2$($C_2O_4$)), lithium hexafluoroarsenate (LiAsF$_6$), lithium trifluoromethanesulfonate (LiCF$_3$SO$_3$), lithium bis(trifluoromethane)sulfonylimide (LiN(CF$_3$SO$_2$)$_2$), lithium bis(fluorosulfonyl)imide (LiN(FSO$_2$)$_2$) (LiSFI), and a combination thereof.

The linear carbonate can be selected from the group consisting of dimethyl carbonate (DMC), diethyl carbonate (DEC), ethylmethylcarbonate (EMC), and a combination thereof.

In Formula (I), R can be selected from the group consisting of a nitrile, methoxy, methyl methyacrylate, methyl sulfoxide, methyl formamide, acetyl, and acetoxy; and x can be 1-5.

The fluorosilane additive can be selected from the group consisting of 3-cyanopropyl)dimethylfluorosilane, (2-cyanoethyl)dimethylfluorosilane, (4-cyanobutyl)dimethylfluorosilane, and a combination thereof.

In the electrolyte, ethylene carbonate (EC) may not be present.

The negative electrode can further include an electrically conductive material, wherein the electrically conductive material comprises carbon black, acetylene black, graphite, carbon nanotubes, carbon fibers, carbon nanofibers, graphene, graphene nanoplatelets, graphene oxide, nitrogen-doped carbon, a metallic powder, a liquid metal, a conductive polymer, or a combination thereof.

The second electroactive material can be selected from the group consisting of Li$_{(1+x)}$>Mn$_2$O$_4$, where 0.1≤x≤1; LiMn$_{(2-x)}$Ni$_x$O$_4$, where 0≤x≤0.5; LiCoO$_2$; Li(Ni$_x$Mn$_y$Co$_z$)O$_2$, where 0≤x≤1, 0≤y≤1, 0≤z≤1, and x+y+z=1; LiNi$_{(1-x-y)}$Co$_x$M$_y$O$_2$, where 0≤x≤0.2, y<0.2, and M is Al, Mg, or Ti; LiFePO$_4$, LiMn$_{2-x}$Fe$_x$PO$_4$, where 0<x<0.3; LiNiCoAlO$_2$; LiMPO$_4$, where M is at least one of Fe, Ni, Co, and Mn; Li(Ni$_x$Mn$_y$Co$_z$Al$_p$)O$_2$, where 0≤x≤1, 0≤y≤1, 0≤z≤1, 0≤P≤1, x+y+z+p=1 (NCMA); LiNiMnCoO$_2$; Li$_2$FePO$_4$F; LiMn$_2$O$_4$; LiFeSiO$_4$; LiNi$_{0.6}$Mn$_{0.2}$Co$_{0.2}$O$_2$ (NMC622), LiMnO$_2$ (LMO), activated carbon, sulfur, and a combination thereof.

The electrochemical cell can be a pouch cell.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," "attached to," or "coupled to" another element or layer, it may be directly on, engaged, connected, attached, or coupled to the other component, element, or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "alkyl" (alone or in combination with another term(s)) refers to a saturated hydrocarbon chain of 1 to about 25 carbon atoms in length, such as, but not limited to, methyl, ethyl, propyl, butyl, pentyl, hexyl, heptyl, octyl, decyl, and so forth. The alkyl group may be straight-chain or branched-chain. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl; pentyl encompasses n-pentyl, tert-pentyl, neopentyl, isopentyl, sec-pentyl and 3-pentyl. Further, as used herein, "Me" refers to methyl, "Et" refers to ethyl, "Pr" refers to propyl, "i-Pr" refers to isopropyl, "Bu" refers to butyl, "t-Bu" refers to tert-butyl, and "Np" refers to neopentyl. In some embodiments, alkyl groups are $C_1$-$C_5$—, $C_1$-$C_4$—, $C_1$-$C_3$—, or $C_1$-$C_2$—, alkyl groups.

The term "alkoxy" refers to —O-alkyl containing from 1 to about 8 carbon atoms. The alkoxy may be straight-chain or branched-chain. Non-limiting examples include methoxy, ethoxy, propoxy, butoxy, isobutoxy, tert-butoxy, pentoxy and hexoxy. In some embodiments, alkoxy groups are $C_1$-$C_5$—, $C_1$-$C_4$—, $C_1$-$C_3$—, or $C_1$-$C_2$—, alkoxy groups.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

I. Silicon-Containing Electrochemical Cell

The present disclosure pertains to improved electrolyte compositions for electrochemical cells (e.g., lithium ion batteries) and electrochemical cells including said improved electrolyte composition. In lithium ion electrochemical cells or batteries, a negative electrode typically includes a lithium insertion material or an alloy host material. As discussed above, conventional electroactive materials for forming a negative electrode or anode include lithium-graphite intercalation compounds, lithium-silicon alloys, lithium-tin compounds, and other lithium alloys. While graphite compounds are most commonly used, certain anode materials with high specific capacity (in comparison with conventional graphite) are of growing interest. Silicon (Si), silicon oxide, and tin are attractive alternatives to graphite as an anode material for rechargeable lithium ion batteries due to their high theoretical capacity. However, silicon-containing materials can experience large volume changes (e.g., volume expansion/contraction) during lithium insertion/extraction (e.g., intercalation and deintercalation), which can lead to fatigue cracking and decrepitation of the electroactive material. Additionally, gases, such as carbon dioxide ($CO_2$) and carbon monoxide (CO), can be generated during cycling of silicon-containing electrochemical cells with electrolytes including fluoroethylene carbonate (FEC). These gases can pose safety concerns and diminish cycle life in silicon-containing electrochemical cells, in particular in pouch cells. These challenges have been a barrier to their widespread use in lithium ion batteries. Thus, improved electrolyte compositions for silicon-containing electrochemical cells are needed.

Lithium-containing electrochemical cells typically include a negative electrode, a positive electrode, an electrolyte for conducting lithium ions between the negative and positive electrodes, and a porous separator between the negative electrode and the positive electrode to physically separate and electrically insulate the electrodes from each other while permitting free ion flow. When assembled in an electrochemical cell, for example, in a lithium-ion battery, the porous separator is infiltrated with a liquid electrolyte. It has been discovered that an electrolyte composition including fluoroethylene carbonate (FEC), a linear carbonate (e.g., dimethyl carbonate (DMC)), and a fluorosilane additive, when incorporated into an electrochemical cell including a silicon-containing negative electrode, can advantageously produce a minimal amount of gassing and result in improved cycle life of the electrochemical cell.

Figure 1:
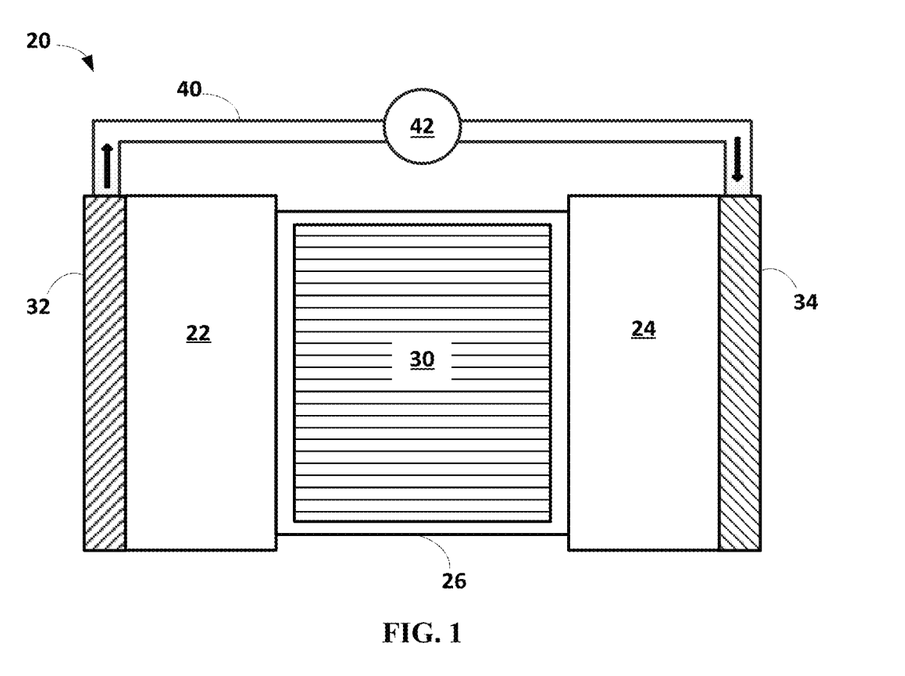
FIG. 1 is a schematic of an exemplary electrochemical battery cell.

An electrochemical cell for use in batteries, for example, a lithium ion battery, or as capacitors is provided herein. For example, an exemplary and schematic illustration of an electrochemical cell (also referred to as the lithium ion battery or battery) 20 is shown in FIG. 1. Electrochemical cell 20 includes a negative electrode 22 (also referred to as a negative electrode layer 22), a positive electrode 24 (also referred to as a positive electrode layer 24), and a separator 26 (e.g., a microporous polymeric separator) disposed between the two electrodes 22, 24. The space between (e.g., the separator 26) the negative electrode 22 and positive electrode 24 can be filled with the electrolyte 30. If there are pores inside the negative electrode 22 and positive electrode 24, the pores may also be filled with the electrolyte 30. The electrolyte 30 can impregnate, infiltrate, or wet the surfaces of and fills the pores of each of the negative electrode 22, the positive electrode 24, and the porous separator 26. A negative electrode current collector 32 may be positioned at or near the negative electrode, 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the battery 20. The separator 26 also contains the electrolyte solution in a network of open pores during the cycling of lithium ions, to facilitate functioning of the battery 20.

The battery 20 can generate an electric current during discharge by way of reversible electrochemical reactions that occur when the external circuit 40 is closed (to connect the negative electrode 22 and the positive electrode 24) when the negative electrode 22 contains a relatively greater quantity of inserted lithium. The chemical potential difference between the positive electrode 24 and the negative electrode 22 drives electrons produced by the oxidation of inserted lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 40 can be harnessed and directed through the load device 42 until the inserted lithium in the negative electrode 22 is depleted and the capacity of the lithium ion battery 20 is diminished.

The lithium ion battery 20 can be charged or re-powered/re-energized at any time by connecting an external power source to the lithium ion battery 20 to reverse the electrochemical reactions that occur during battery discharge. The connection of an external power source to the lithium ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with inserted lithium for consumption during the next battery discharge event. As such, a complete discharging event followed by a complete charging event is considered to be a cycle, where lithium ions are cycled between the positive electrode 24 and the negative electrode 22. The external power source that may be used to charge the lithium ion battery 20 may vary depending on the size, construction, and particular end-use of the lithium ion battery 20. Some notable and exemplary external power sources include, but are not limited to, an AC wall outlet and a motor vehicle alternator.

In many battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package. The negative electrode current collector 32 and positive electrode current collector 34 respectively collect and move free electrons to and from an external circuit 40.

Furthermore, the battery 20 can include a variety of other components that while not depicted here are nonetheless known to those of skill in the art. For instance, the lithium ion battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. The battery 20 shown in FIG. 1 includes a liquid electrolyte 30 and shows representative concepts of battery operation.

As noted above, the size and shape of the lithium ion battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium ion cells or batteries to produce a greater voltage output and power density if it is required by the load device 42.

Accordingly, the battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the battery 20 for purposes of storing energy.

The present technology pertains to improved electrochemical cells, especially lithium-ion batteries. In various instances, such cells are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example.

A. Electrolyte

With renewed reference to FIG. 1, the positive electrode 24, the negative electrode 22, and the separator 26 each includes an electrolyte composition or system 30 (electrolyte 30) inside their pores, capable of conducting lithium ions between the negative electrode 22 and the positive electrode 24. An electrolyte composition 30 is provided herein in liquid or gel form, which is capable of conducting lithium ions between the negative electrode 22 and the positive electrode 24 may be used in the battery 20. In certain aspects, the electrolyte composition 30 may be a non-aqueous liquid electrolyte solution that includes a lithium salt dissolved in an organic solvent or a mixture of organic solvents. In any embodiment, the electrolyte 30 includes a lithium salt, fluoroethylene carbonate (FEC), a linear carbonate, vinylene carbonate, and a fluorosilane additive.

For example, a non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (Li-BOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl) imide ($LiN(FSO_2)_2$) (LiSFI), and combinations thereof. A lithium salt may be present in the electrolyte composition in an amount of greater than or equal to about 0.5 mol/L, greater than or equal to about 0.8 mol/L, greater than or equal to about 1 mol/L, greater than or equal to about 1.2 mol/L, greater than or equal to about 1.4 mol/L, greater than or equal to about 1.5 mol/L, greater than or equal to about 1.7 mol/L, or about 2 mol/L; from about 0.5 mol/L to about 2 mol/L, about 0.8 mol/L to about 1.7 mol/L, or about 0.8 mol/L to about 1.5 mol/L.

In addition to FEC, the electrolyte composition 30 may also include a variety of non-aqueous aprotic organic solvents, such as a linear carbonate. Examples of a linear carbonate include, but are not limited to, dimethyl carbonate (DMC), diethyl carbonate (DEC), ethylmethylcarbonate (EMC), and combinations thereof. In any embodiment, FEC and/or the linear carbonate may be present in the electrolyte 30 in an amount, which minimizes gassing that can occur during cycling of the electrochemical cell. For example, FEC may be present in the electrolyte 30 in an amount, based on total weight of the electrolyte, of greater than or equal to about 5 wt %, greater than or equal to about 10 wt %, greater than or equal to about 15 wt %, greater than or equal to about 20 wt %, greater than or equal to about 25 wt %, greater than or equal to about 30 wt %, greater than or equal to about 40 wt %, or about 50 wt %; or from about 5 wt % to about 50 wt %, about 5 wt % to about 30 wt %, about 10 wt % to about 30 wt %, or about 10 wt % to about 25 wt %. The linear carbonate may be present in the electrolyte 30 in an amount, based on total weight of the electrolyte, of greater than or equal to about 40 wt %, greater than or equal to about 50 wt %, greater than or equal to about 60 wt %, greater than or equal to about 70 wt %, greater than or equal to about 75 wt %, or about 80 wt %; or from about 40 wt % to about 80 wt %, about 50 wt % to about 80 wt %, or about 50 wt % to about 75 wt %.

Additionally or alternatively, FEC and the linear carbonate may be present in the electrolyte composition in a volumetric ratio of about 1:2 v/v, about 1:3 v/v, about 1:4 v/v, about 1:5 v/v, about 1:6 v/v, about 1:7 v/v, about 1:8 v/v, about 1:9 v/v, or about 1:10 v/v; or from about 1:2 v/v to about 1:10 v/v, about 1:3 v/v to about 1:9 v/v, about 1:2 v/v o about 1:6 v/v, or about 1:3 v/v to about 1:5 v/v. For example, FEC may be present in a mixture of FEC and linear carbonate, based on total weight of the mixture, of greater than or equal to about 5 wt %, greater than or equal to about 10 wt %, greater than or equal to about 20 wt %, greater than or equal to about 25 wt %, greater than or equal to about 30 wt %, or about 40 wt %; from about 5 wt % to about 40 wt %, about 5 wt % to about 30 wt %, about 10 wt % to about 30 wt %, or about 10 wt % to about 25 wt %. The balance of the mixture of FEC and linear carbonate may be linear carbonate, for example, present in an amount, based on total amount of the mixture, of about 60 wt % to about 95 wt %, about 70 wt % to about 95 wt %, or about 75 wt % to about 90 wt %.

Optionally, the electrolyte composition 30 may include one or more various alkyl carbonates, such as cyclic carbonates (e.g., ethylene carbonate (EC), propylene carbonate (PC), butylene carbonate (BC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof. Alternatively, the electrolyte composition 30 may not substantially include any further aforementioned alkyl carbonates. For example, the electrolyte composition 30 may not include EC.

In any embodiment, the fluorosilane additive corresponds in structure to Formula I:

(I)

wherein R may be a polar aprotic group and x can range from 1-20. In various aspects, x can range from 1-15, 3-10, 1-5, or 1-4. Examples of a polar aprotic group include, but are not limited to, an ester, an oxide, an ether, an tertiary amine, an alkoxy, a ketone, an aldehyde, a carbonic acid salt, a nitrile, a nitro, a sulfoxide, an acetyl, an acrylate, and a hydrogen phosphide. For example, R may be selected from the group consisting of a nitrile (—CN) (also referred to as "cyano"), an alkoxy (e.g., methoxy, ethoxy, propoxy), an alkyl methacrylate (e.g., methyl methylacrylate), an alkyl sulfoxide (e.g., methyl sulfoxide (—SOCH$_3$)), alkyl formamide (e.g., methyl formamide), acetyl (—COCH$_3$), and acetoxy (—OCOCH$_3$) (also referred to as "acetlyoxy"). In some embodiments, R may be selected from the group consisting of a nitrile, methoxy, methyl methyacrylate, methyl sulfoxide, methyl formamide, acetyl, and acetoxy. In any embodiment, the flourosilane additive may be selected from the group consisting of (3-cyanopropyl)dimethylfluorosilane, (2-cyanoethyl)dimethylfluorosilane, (4-cyanobutyl)dimethylfluorosilane, and a combination thereof.

In any embodiment, each of the fluorosilane additive and the vinylene carbonate may be present in the electrolyte 30 in an amount, based on total weight of the electrolyte, of greater than or equal to about 1 wt %, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, or about 10 wt %; or from about 1 wt % to about 10 wt %, about 1 wt % to about 7 wt %, about 1 wt % to about 5 wt %, or about 1 wt % to about 3 wt %.

The electrolyte composition may be prepared by admixing FEC and a linear carbonate in the amounts described above to form a mixture. A lithium salt as described above may be added and dissolved into the FEC and linear carbonate mixture followed by addition of the vinylene carbonate and the flourosilane additive in amounts as described above to form the electrolyte composition. Addition of the components of the electrolyte composition as well as mixing may be performed at room temperature (e.g., 18° C. to 25° C.) in a climate controlled environment.

B. Separator

The separator 26 may comprise, for example, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator membranes include CELGARD®2500 (a monolayer polypropylene separator) and CELGARD®2325 (a trilayer polypropylene/polyethylene/polypropylene separator) available from Celgard LLC.

In certain aspects, the separator 26 may further include one or more of a ceramic coating layer and a heat-resistant material coating. The ceramic coating layer and/or the heat-resistant material coating may be disposed on one or more sides of the separator 26. The material forming the ceramic layer may be selected from the group consisting of: alumina (Al$_2$O$_3$), silica (SiO$_2$), and combinations thereof. The heat-resistant material may be selected from the group consisting of: Nomex, Aramid, and combinations thereof.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics. In certain aspects, the separator 26 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 26 are contemplated, as well as the many manufacturing methods that may be employed to produce such a microporous polymer separator 26.

C. Negative Electrode

The negative electrode 22 includes a first electroactive material comprising a lithium host material capable of functioning as a negative terminal of a lithium ion battery. In any embodiment, the first electroactive material includes a silicon-containing material. In various aspect, the first electroactive material may be comprised of only silicon-containing material, i.e., the first electroactive material may be 100% silicon-containing material. The silicon-containing electroactive material can comprise silicon, carbon coated silicon, a silicon oxide, a lithium silicon alloy, a silicon tin alloy, a silicon iron alloy, a silicon aluminum alloy, a silicon cobalt alloy, or a combination thereof. Examples of silicon-containing alloys, such as binary and ternary alloys, include but are not limited, to Si—Sn, SiSnFe, SiSnAl, SiFeCo, and the like. In certain embodiments, the silicon-containing electroactive material comprises or consists essentially of silicon (rather than an alloy of silicon) in either crystalline or amorphous structures. Carbon coated silicon particles and methods of forming such particles are described in U.S. patent application Ser. No. 16/668,882, which is incorporated herein by reference in its entirety. For example, the silicon-containing particles may include a continuous intermediate layer comprising carbides disposed on a surface of the silicon-containing particles and a continuous carbon coating disposed adjacent to the continuous intermediate layer. The continuous carbon coating may be a multilayered carbon coating comprising an inner first layer comprising amorphous carbon disposed adjacent to the continuous intermediate layer and an outer second layer comprising graphitic carbon. In some embodiments, the first electroactive material can be pre-lithiated via techniques known in the art.

The silicon-containing electroactive material may have a round geometry or an axial geometry and thus may be in the form of particles or in alternative variations, may be in the form of thin film, nanowires, nanorods, nanosprings, or hollow tubes. In particular, the silicon-containing electroactive material is present as silicon-containing particles. The silicon-containing electroactive material structures, e.g., silicon structures, may be nanometer sized or micrometer sized, preferably micrometer sized. Such silicon structures can help accommodate the large volume changes that silicon undergoes during lithium cycling in a lithium ion battery. The term "axial geometry" refers to particles generally having a rod, fibrous, or otherwise cylindrical shape having an evident long or elongated axis. Generally, an aspect ratio (AR) for cylindrical shapes (e.g., a fiber or rod) is defined as AR=L/D where L is the length of the longest axis and D is the diameter of the cylinder or fiber. Exemplary axial-geometry electroactive material particles suitable for use in the present disclosure may have high aspect ratios, ranging from about 10 to about 5,000, for example. In certain variations, the first electroactive material particles having an axial-geometry include fibers, wires, flakes, whiskers, filaments, tubes, rods, and the like.

The term "round geometry" typically applies to particles having lower aspect ratios, for example, an aspect ratio closer to 1 (e.g., less than 10). It should be noted that the particle geometry may vary from a true round shape and, for example, may include oblong or oval shapes, including prolate or oblate spheroids, agglomerated particles, polygonal (e.g., hexagonal) particles or other shapes that generally have a low aspect ratio. Oblate spheroids may have disc shapes that have relatively high aspect ratios. Thus, a generally round geometry particle is not limited to relatively low aspect ratios and spherical shapes. For silicon-containing electroactive material particles, an average particle size diameter of a suitable silicon-containing particle may be greater than or equal to about 10 nm, greater than or equal to about 100 nm, greater than or equal to about 1 μm, greater than or equal to about 2 μm, greater than or equal to about 5 μm, greater than or equal to about 8 μm, greater than or equal to about 10 μm, greater than or equal to about 12.5 μm, greater than or equal to about 15 μm, greater than or equal to about 17.5 μm, greater than or equal to about 20 μm, or about 25 μm; or from about 10 nm to about 25 μm, about 100 nm to about 20 μm, about 1 μm to about 20 μm, about 1 μm to about 15 μm, about 1 μm to about 10 μm, or about 2 μm to about 8 μm.

Additionally, the negative electrode 22 can include an electrically conductive material and a polymeric binder. Examples of electrically conductive material include, but are not limited to, carbon black, graphite, acetylene black (such as KETCHEN™ black or DENKA™ black), carbon nanotubes, carbon fibers, carbon nanofibers, graphene, graphene nanoplatelets, graphene oxide, nitrogen-doped carbon, metallic powder (e.g., copper, nickel, steel), liquid metals (e.g., Ga, GaInSn), a conductive polymer (e.g., include polyaniline, polythiophene, polyacetylene, polypyrrole, and the like) and combinations thereof. Such electrically conductive material in particle form may have a round geometry or an axial geometry as described above.

As used herein, the term "graphene nanoplatelet" refers to a nanoplate or stack of graphene layers. In a particular embodiment, the electrically conductive material comprises graphene nanoplatelets and optionally, one or more other electrically conductive materials listed above. In various aspects, the graphene nanoplatelets have an average particle diameter or lateral dimension of greater than or equal to about 100 nm, greater than or equal to about 1 μm, greater than or equal to about 5 μm, greater than or equal to about 10 μm, greater than or equal to about 15 μm, greater than or equal to about 20 μm, greater than or equal to about 25 μm, or about 30 μm; or from about 100 nm to about 30 μm, about 1 μm to about 25 μm, about 5 μm to about 25 μm, or about 10 μm to about 20 μm. Additionally or alternatively, the graphene nanoplatelets may have a thickness of less than or equal to about 250 nm, less than or equal to about 100 nm, less than or equal to about 50 nm, less than or equal to about 25 nm, less than or equal to about 10 nm, less than or equal to about 5 nm, or about 1 nm; or from about 1 nm to about 250 nm, about 1 nm to about 100 nm, about 1 nm to about 50 nm, about 1 nm to about 10 nm, or about 1 nm to about 5 nm. Additionally or alternatively, the electrically conductive material (e.g., graphene nanoplatelets) may have a surface area of greater than or equal to about 25 m$^2$/g, greater than or equal to about 50 m$^2$/g, greater than or equal to about 100 m$^2$/g, greater than or equal to about 250 m$^2$/g, greater than or equal to about 500 m$^2$/g, or about 750 m$^2$/g; from about 25 m$^2$/g to about 75 m$^2$/g, about 50 m$^2$/g to about 100 m$^2$/g, about 25 m$^2$/g to about 750 m$^2$/g, about 250 m$^2$/g to about 750 m$^2$/g, or about 500 m$^2$/g to about 750 m$^2$/g.

As used herein, the term "polymeric binder" includes polymer precursors used to form the polymeric binder, for example, monomers or monomer systems that can form any one of the polymeric binders disclosed above. Examples of suitable polymeric binders, include but are not limited to, polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly (acrylic acid) PAA, polyimide, polyamide, sodium alginate, lithium alginate, and combinations thereof. In some embodiments, the polymeric binder may be a non-aqueous solvent-based polymer or an aqueous-based polymer. In particular, the polymeric binder may be a non-aqueous solvent-based polymer that can demonstrate less capacity fade, provide a more robust mechanical network and improved mechanical properties to handle silicon particle expansion more effectively, and possess good chemical and thermal resistance. For example, the polymeric binder may include polyimide, polyamide, polyacrylonitrile, polyacrylic acid, a salt (e.g., potassium, sodium, lithium) of polyacrylic acid, polyacrylamide, polyvinyl alcohol, carboxymethyl cellulose, or a combination thereof. The first electroactive material may be intermingled with the electrically conductive material and at least one polymeric binder. Polymeric binder can fulfill multiple roles in an electrode, including: (i) enabling the electronic and ionic conductivities of the composite electrode, (ii) providing the electrode integrity, e.g., the integrity of the electrode and its components, as well as its adhesion with the current collector, and (iii) participating in the formation of solid electrolyte interphase (SEI), which plays an important role as the kinetics of lithium intercalation is predominantly determined by the SEI.

In various aspects, the first electroactive material may be present in the negative electrode in an amount, based on total weight of the negative electrode, of greater than or equal to about 50 wt %, greater than or equal to about 60 wt %, greater than or equal to about 70 wt %, greater than or equal to about 80 wt %, greater than or equal to about 90 wt %, greater than or equal to about 95 wt %, or about 98 wt %; or from about 50 wt % to about 98 wt %, about 60 wt % to about 95 wt %, about 60 wt % to about 95 wt %, or about 60 wt % to about 80 wt %. Additionally or alternatively, the electrically conductive material may be present in the negative electrode in an amount, based on total weight of the negative electrode, of greater than or equal to about 0.2 wt %, greater than or equal to about 1 wt %, greater than or equal to about 5 wt %, greater than or equal to about 10 wt %, greater than or equal to about 15 wt %, greater than or equal to about 20 wt %, or about 25 wt %; or from about 0.2 wt % to about 25 wt %, about 1 wt % to about 25 wt %, about 2 wt % to about 20 wt %, about 5 wt % to about 15 wt %, or about 2 wt % to about 10 wt %. Additionally or alternatively, the polymeric binder may be present in the negative electrode in an amount, based on total weight of the negative electrode, of greater than or equal to about 0.5 wt %, greater than or equal to about 1 wt %, greater than or equal to about 3 wt %, greater than or equal to about 5 wt %, greater than or equal to about 10 wt %, greater than or equal to about 15 wt %, greater than or equal to about 20 wt %, greater than or equal to about 25 wt %, or about 30 wt %; or from about 0.5 wt % to about 30 wt %, about 1 wt % to about 25 wt %, about 3 wt % to about 20 wt %, or about 5 wt % to about 15 wt %.

D. Positive Electrode

The positive electrode 24 may be formed from a second electroactive material that can sufficiently undergo lithium intercalation and deintercalation while functioning as the positive terminal of the lithium ion battery 20. The positive electrode 24 may also include a polymeric binder material to structurally fortify the lithium-based active material and an electrically conductive material. One exemplary common class of known materials that can be used to form the positive electrode 24 is layered lithium transitional metal oxides. For example, in certain embodiments, the positive electrode 24 may comprise $Li_{(1+x)}Mn_2O_4$, where $0.1 \leq x \leq 1$; $LiMn_{(2-x)}Ni_xO_4$, where $0 \leq x \leq 0.5$; $LiCoO_2$; $Li(Ni_xMn_yCo_z)O_2$, where $0 \leq x \leq 1$, $0 \leq y \leq 1$, $0 \leq z \leq 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LiMPO_4$, where M is at least one of Fe, Ni, Co, and Mn; $Li(Ni_xMn_yCo_zAl_p)O_2$, where $0 \leq x \leq 1$, $0 \leq y \leq 1$, $0 \leq z \leq 1$, $0 \leq P \leq 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur (e.g., greater than 60 wt % based on total weight of the positive electrode), or combinations thereof.

In certain variations, the second electroactive materials may be intermingled with an electronically conductive material as described herein that provides an electron conduction path and/or at least one polymeric binder material as described herein that improves the structural integrity of the electrode. For example, the first electroactive materials and electronically or electrically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), poly(acrylic acid) PAA, polyimide, polyamide, sodium alginate, or lithium alginate.

E. Current Collectors

The positive electrode current collector 34 may be formed from aluminum (Al) or any other appropriate electrically conductive material known to those of skill in the art. The negative electrode current collector 32 may comprise a metal comprising copper, nickel, or alloys thereof, stainless steel, or other appropriate electrically conductive materials known to those of skill in the art. In certain aspects, the positive electrode current collector 34 and/or negative electrode current collector 32 may be in the form of a foil, slit mesh, and/or woven mesh.

Figure 2:
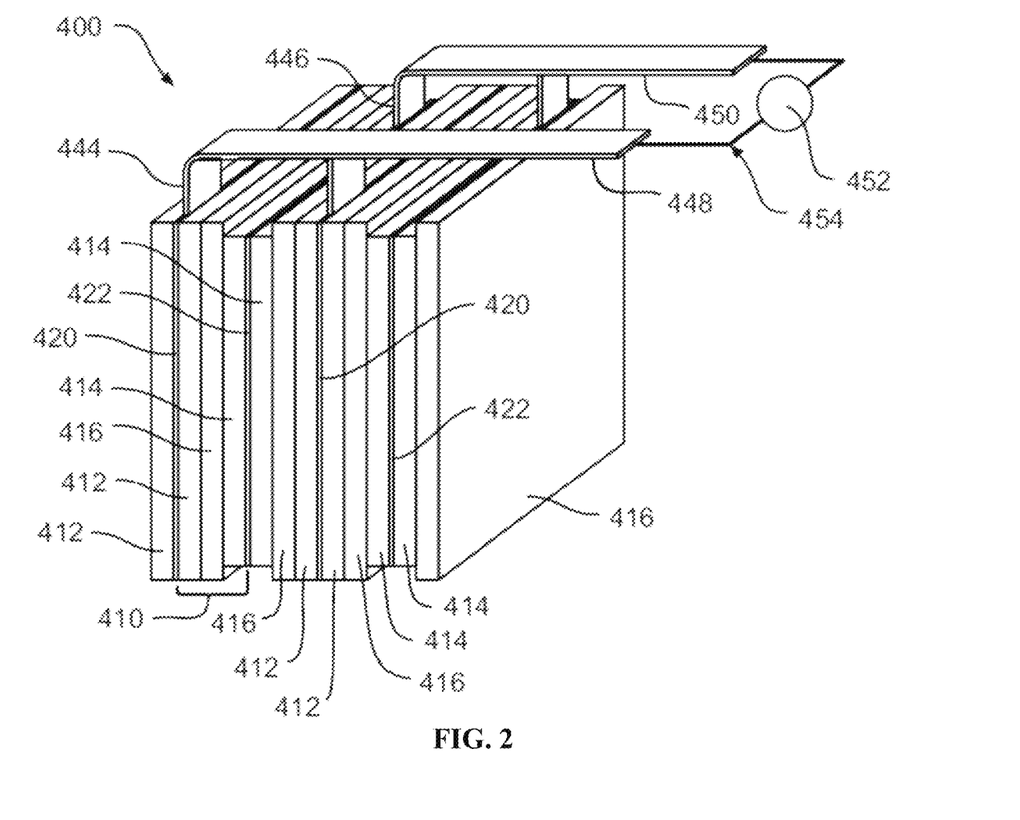
FIG. 2 is a schematic of an exemplary battery.

Referring now to FIG. 2, the electrochemical cell 20 (as shown in FIG. 1) may be combined with one or more other electrochemical cells to produce a lithium ion battery 400. The lithium ion battery 400 illustrated in FIG. 2 includes multiple rectangular-shaped electrochemical cells 410. Anywhere from 5 to 150 electrochemical cells 410 may be stacked side-by-side in a modular configuration and connected in series or parallel to form a lithium ion battery 400, for example, for use in a vehicle powertrain. The lithium ion battery 400 can be further connected serially or in parallel to other similarly constructed lithium ion batteries to form a lithium ion battery pack that exhibits the voltage and current capacity demanded for a particular application, e.g., for a vehicle. It should be understood the lithium ion battery 400 shown in FIG. 2 is only a schematic illustration, and is not intended to inform the relative sizes of the components of any of the electrochemical cells 410 or to limit the wide variety of structural configurations a lithium ion battery 400 may assume. Various structural modifications to the lithium ion battery 400 shown in FIG. 2 are possible despite what is explicitly illustrated.

Each electrochemical cell 410 includes a negative electrode 412, a positive electrode 414, and a separator 416 situated between the two electrodes 412, 414. Each of the negative electrode 412, the positive electrode 414, and the separator 416 is impregnated, infiltrated, or wetted with a liquid electrolyte (e.g., electrolyte 30) capable of transporting lithium ions. A negative electrode current collector 420 that includes a negative polarity tab 444 is located between the negative electrodes 412 of adjacent electrochemical cells 410. Likewise, a positive electrode current collector 422 that includes a positive polarity tab 446 is located between neighboring positive electrodes 424. The negative polarity tab 444 is electrically coupled to a negative terminal 448 and the positive polarity tab 446 is electrically coupled to a positive terminal 450. An applied compressive force usually presses the current collectors 420, 422, against the electrodes 412, 414 and the electrodes 412, 414 against the separator 416 to achieve intimate interfacial contact between the several contacting components of each electrochemical cell 410.

The battery 400 may include more than two pairs of positive and negative electrodes 412, 414. In one form, the battery 400 may include 15-60 pairs of positive and negative electrodes 412, 414. In addition, although the battery 400 depicted in FIG. 2 is made up of a plurality of discrete electrodes 412, 414 and separators 416, other arrangements are certainly possible. For example, instead of discrete separators 416, the positive and negative electrodes 412, 414 may be separated from one another by winding or interweaving a single continuous separator sheet between the positive and negative electrodes 412, 414. In another example, the battery 400 may include continuous and sequentially stacked positive electrode, separator, and negative electrode sheets folded or rolled together to form a "jelly roll."

The negative and positive terminals 448, 450 of the lithium ion battery 400 are connected to an electrical device 452 as part of an interruptible circuit 454 established between the negative electrodes 412 and the positive electrodes 414 of the many electrochemical cells 410. The electrical device 452 may comprise an electrical load or power-generating device. An electrical load is a power-consuming device that is powered fully or partially by the lithium ion battery 400. Conversely, a power-generating device is one that charges or re-powers the lithium ion battery 400 through an applied external voltage. The electrical load and the power-generating device can be the same device in some instances. For example, the electrical device 452 may be an electric motor for a hybrid electric vehicle or an extended range electric vehicle that is designed to draw an electric current from the lithium ion battery 400 during acceleration and provide a regenerative electric current to the lithium ion battery 400 during deceleration. The electrical load and the power-generating device can also be different devices. For example, the electrical load may be an electric motor for a hybrid electric vehicle or an extended range electric vehicle and the power-generating device may be an AC wall outlet, an internal combustion engine, and/or a vehicle alternator.

The lithium ion battery 400 can provide a useful electrical current to the electrical device 452 by way of the reversible electrochemical reactions that occur in the electrochemical cells 410 when the interruptible circuit 454 is closed to connect the negative terminal 448 and the positive terminal 450 at a time when the negative electrodes 412 contain a sufficient quantity of intercalated lithium (i.e., during discharge). When the negative electrodes 412 are depleted of intercalated lithium and the capacity of the electrochemical cells 410 is spent. The lithium ion battery 400 can be charged or re-powered by applying an external voltage originating from the electrical device 452 to the electrochemical cells 410 to reverse the electrochemical reactions that occurred during discharge.

Although not depicted in the drawings, the lithium ion battery 400 may include a wide range of other components. For example, the lithium ion battery 400 may include a casing, gaskets, terminal caps, and any other desirable components or materials that may be situated between or around the electrochemical cells 410 for performance related or other practical purposes. For example, the lithium ion battery 400 may be enclosed within a case (not shown). The case may comprise a metal, such as aluminum or steel, or the case may comprise a film pouch material with multiple layers of lamination.

It is contemplated herein that the electrochemical cell 20, 400 that is formed may be a pouch cell, coin cell, or another full electrochemical cell having a cylindrical format or wounded prismatic format. In the prismatic format, the electrodes and current collectors form a stacked geometric structure that may be sealed with a packaging material capable of preventing air and water contamination of the cell 20, 400. In the cylindrical format, the multi-layered structure may be wound into a configuration similar to a jelly roll. The wound structure may be sealed in a metal container after the electrolyte 30 is added. In pouch cells, rather than using a metallic cylinder and glass-to-metal electrical feed-through, conductive foil-tabs (tab 444, 446) can be welded to the electrodes and brought to the outside in a fully sealed way. The pouch material may include one or more layers of a suitable polymer, for example, a lithium-containing polymer.

EXAMPLES

General Information

Unless otherwise indicated silicon particles were used as the electroactive material in the anode in the cells formed in the below examples.

Unless otherwise indicated below, each of the pouch cells prepared in the Examples below were composed of 6 layers of a cathode ($LiNi_{0.6}Mn_{0.2}Co_{0.2}O_2$) and 7 layers of an anode, as further described below, with Celgard® 2325 as the separator and enclosed in a polymer pouch (D-EL408PH (3) film obtained from Dai Nippon Printing Co., Ltd.).

Unless otherwise indicated below, each of the pouch cells prepared in the Examples below were tested as follows: at C/20 for 2 formation cycles and C/5 for cycling at 25° C. The cells were charged to 4.2 V and hold at 4.2 V until the current decay to C/50. Then the cells were discharged to 3.0 V. The rest time between charge and discharge was 30 minutes.

Example 1

Comparative Pouch Cell A and Pouch Cell 1 each included a cathode and separator, as described above, with an anode composed of silicon, polyimide binder, and carbon black. Pouch Cells 2-4 each included a cathode and separator, as described above, with an anode composed of silicon, polyimide binder, and graphene nanoplatelets. The electrolyte compositions included in Comparative Pouch Cell A and Pouch Cells 1-4 are shown below in Table 1.

TABLE 1

| Pouch Cell | Electrolyte Composition |
|---|---|
| Comparative A | 10 wt % FEC in 1M $LiPF_6$ EC/DMC/EMC (1:1:1 V/V/V) |
| 1 | 1.2M LiPF6 in FEC:DMC(1:3, V/V) with vinylene carbonate (2 wt %) and (3-cyanopropyl)dimethylfluorosilane (3 wt %) |
| 2 | 1.2M LiPF6 in FEC:DMC(1:3, V/V) with vinylene carbonate (2 wt %) and (3-cyanopropyl)dimethylfluorosilane (3 wt %) |
| 3 | 1.2M LiPF6 in FEC:DMC(1:4, V/V) with vinylene carbonate (2 wt %) and (3-cyanopropyl)dimethylfluorosilane (3 wt %) |
| 34 | 1.2M LiPF6 in FEC:DMC(1:9, V/V) with vinylene carbonate (2 wt %) and (3-cyanopropyl)dimethylfluorosilane (3 wt %) |

Figure 3:
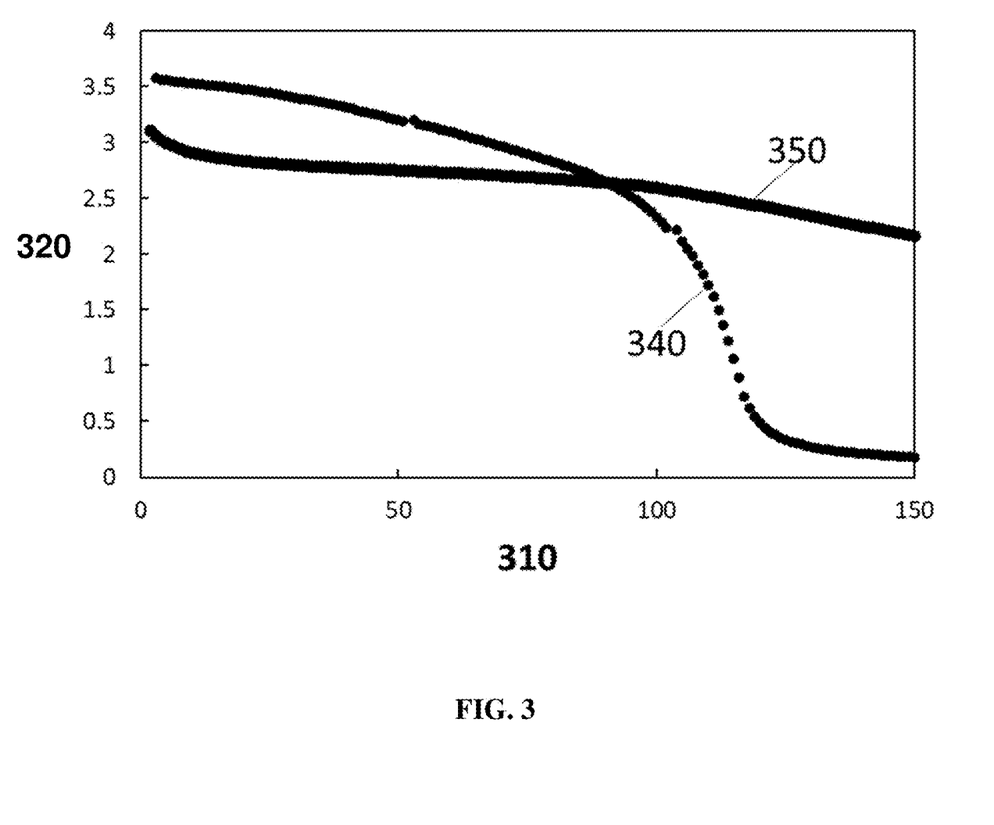
FIG. 3 is a graph depicting discharge charge capacity (Ahr) versus cycle number for Comparative Pouch Cell A and Pouch Cell 1 formed according to Example 1.
Figure 4:
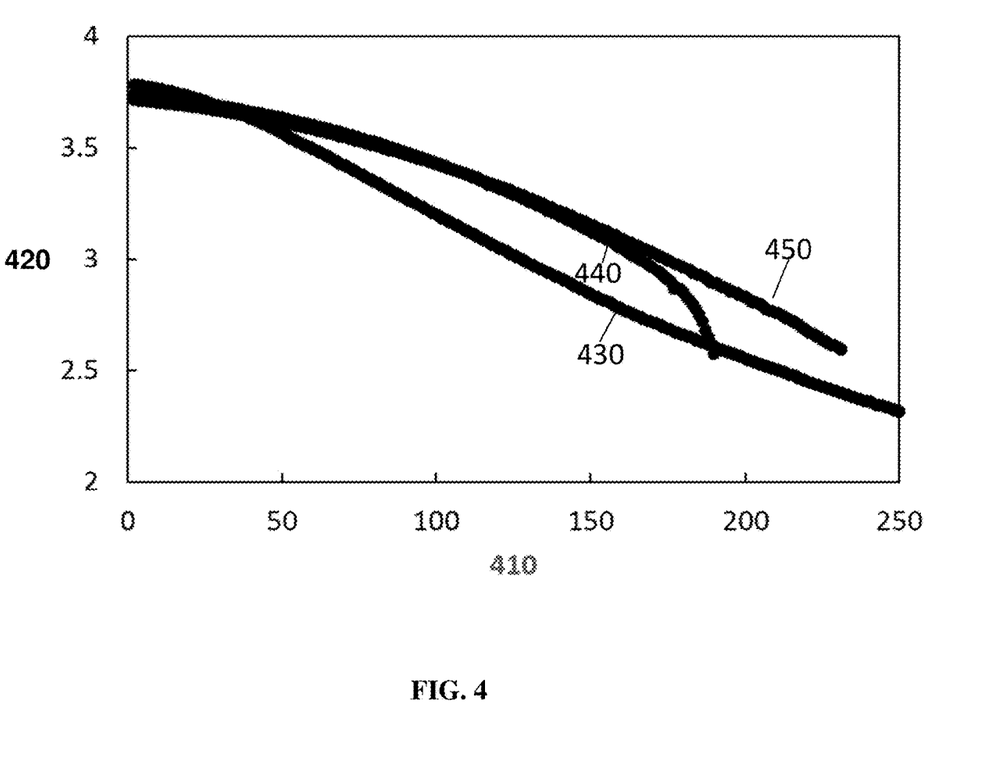
FIG. 4 is a graph depicting discharge charge capacity (Ahr) versus cycle number for Pouch Cells 2-4 formed according to Example 1.
Figure 5A:
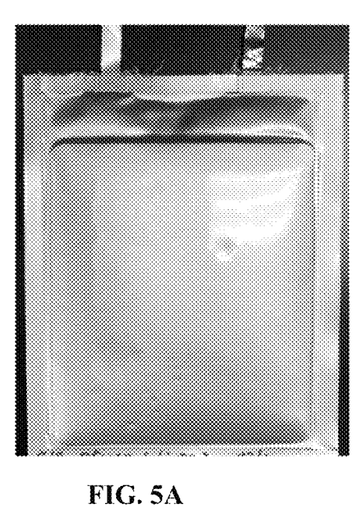
FIGS. 5A and 5B are photographic images of Pouch Cell 2 after cycling.
Figure 5B:
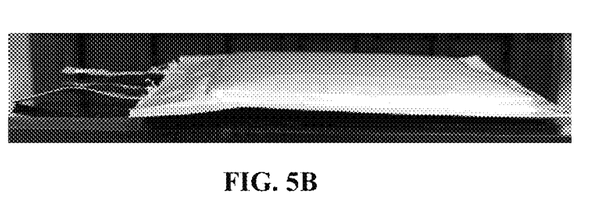
Figure 5C:
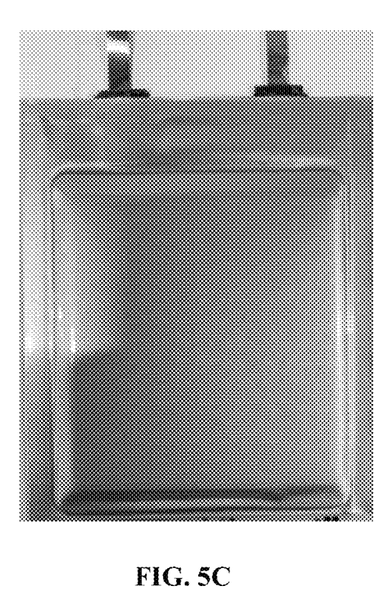
FIGS. 5C and 5D are photographic images of Pouch Cell 3 after cycling.
Figure 5D:
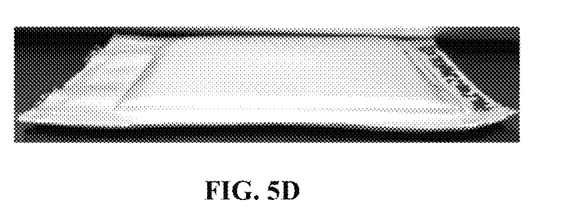

Comparative Pouch Cell A and Pouch Cells 1-4 were cycled as described above. The results are shown in FIGS. 3 and 4. In FIG. 3, the x-axis (310) is cycle number, while discharge charge capacity (Ahr) is shown on the left hand y-axis (320) for Comparative Cell A (340) and Pouch Cell 1 (350). In FIG. 4, the x-axis (410) is cycle number, while discharge charge capacity (Ahr) is shown on the left hand y-axis (420) for Pouch Cell 2 (430), Pouch Cell 4 (440) and Pouch Cell 3 (450). As shown in FIG. 4, 80% capacity retention was achieved for Pouch Cell 2 up to 118 cycles, for Pouch Cell 3 up to 178 cycles, and for Pouch 4 up to 166 cycles. FIGS. 5A and 5B are photographic images of Pouch Cell 2 after cycling showing the gas produced (10 ml gas produced). FIGS. 5C and 5D are photographic images of Pouch Cell 3 after cycling showing the gas produced (0.95 ml gas produced).

Example 2

Comparative Pouch Cell B included a cathode and separator, as described above, with an anode composed of silicon, polyimide binder, and carbon black. The electrolyte composition included in Comparative Pouch Cell B is shown below in Table 2.

TABLE 2

| Pouch Cell | Electrolyte Composition |
|---|---|
| Comparative B | 1.2M LiPF6 in FEC:EMC(1:4, V/V) with vinylene carbonate (2 wt %) and (3-cyanopropyl)dimethylfluorosilane (3 wt %) |

Figure 6:
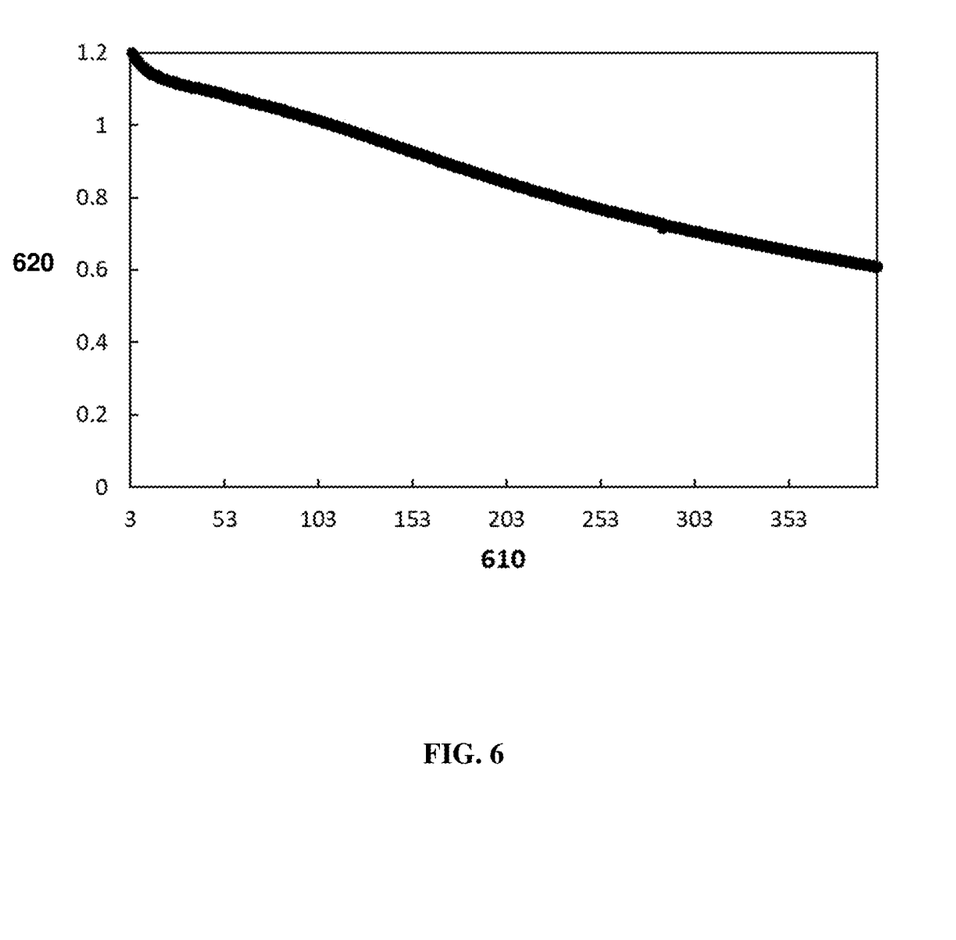
FIG. 6 is a graph depicting discharge charge capacity (Ahr) versus cycle number for Comparative Pouch Cell B formed according to Example 2.

Comparative Pouch Cell B was cycled as described above. The results are shown in FIG. 6. In FIG. 6, the x-axis (610) is cycle number, while discharge charge capacity (Ahr) is shown on the left hand y-axis (620) for Comparative Pouch Cell B.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrolyte composition for an electrochemical cell, the electrolyte composition comprising:
    a lithium salt selected from the group consisting of lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis (oxalato) borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane) sulfonylimide ($LiN(CF_3SO_2)_2$), lithium bis(fluorosulfonyl)imide ($LiN(FSO_2)_2$) (LiSFl), and a combination thereof;
    fluoroethylene carbonate (FEC) present in an amount of about 15 wt. % to about 30 wt. %, based on total weight of the electrolyte composition;
    a linear carbonate selected from the group consisting of dimethyl carbonate (DMC), diethyl carbonate (DEC), ethylmethylcarbonate (EMC), and a combination thereof, wherein the linear carbonate is present in an amount about 50 wt. % to about 80 wt. %, based on total weight of the electrolyte composition, wherein the FEC and the linear carbonate are present in a ratio of about 1:3 v/v to about 1:9 v/v;
    vinylene carbonate present in an amount of about 1 wt. % to about 5 wt. %, based on total weight of the electrolyte composition; and
    a fluorosilane additive selected from the group consisting of (3-cyanopropyl) dimethylfluorosilane, (2-cyanoethyl) dimethylfluorosilane, (4-cyanobutyl) dimethylfluorosilane, and a combination thereof.

2. The electrolyte composition of claim 1, wherein the fluorosilane additive is present in an amount of about 1 wt. % to about 5 wt. %, based on total weight of the electrolyte composition.

3. The electrolyte composition of claim 1, wherein ethylene carbonate (EC) is not present.

4. An electrolyte composition for an electrochemical cell, the electrolyte composition comprising:
    a lithium salt selected from the group consisting of lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis (oxalato) borate ($LiB(C_2O_4)_2$) (LiBOB), lithium difluorooxalatoborate ($LiBF_2$ ($C_2O_4$)), lithium hexafluoroarsenate ($LiAsF_6$), lithium trifluoromethanesulfonate ($LiCF_3SO_3$), lithium bis(trifluoromethane) sulfonylimide (LiN ($CF_3SO_2)_2$), lithium bis(fluorosulfonyl)imide (LiN ($FSO_2)_2$) (LiSFl), and a combination thereof;

fluoroethylene carbonate (FEC) present in an amount of about 15 wt. % to about 30 wt. %, based on total weight of the electrolyte composition;
a linear carbonate selected from the group consisting of dimethyl carbonate (DMC), diethyl carbonate (DEC), ethylmethylcarbonate (EMC), and a combination thereof, wherein the linear carbonate is present in an amount about 50 wt. % to about 80 wt. %, based on total weight of the electrolyte composition, wherein the FEC and the linear carbonate are present in a ratio of about 1:3 v/v to about 1:9 v/v;
vinylene carbonate present in an amount of about 1 wt. % to about 5 wt. %, based on total weight of the electrolyte composition; and
a fluorosilane additive selected from the group consisting of (2-cyanoethyl) dimethylfluorosilane, (4-cyanobutyl) dimethylfluorosilane, and a combination thereof.

5. An electrochemical cell comprising:
a negative electrode comprising a first electroactive material comprising silicon;
a positive electrode comprising a second electroactive material, wherein the positive electrode is spaced apart from the negative electrode;
a porous separator disposed between confronting surfaces of the negative electrode and the positive electrode; and
an electrolyte infiltrating one or more of: the negative electrode, the positive electrode, and the porous separator,
wherein the liquid electrolyte comprises:
a lithium salt selected from the group consisting of lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis (oxalato) borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide (LiN $(CF_3SO_2)_2$), lithium bis(fluorosulfonyl)imide (LiN $(FSO_2)_2$) (LiSFl), and a combination thereof;
fluoroethylene carbonate (FEC) present in an amount of about 15 wt. % to about 30 wt. %, based on total weight of the electrolyte composition;
a linear carbonate selected from the group consisting of dimethyl carbonate (DMC), diethyl carbonate (DEC), ethylmethylcarbonate (EMC), and a combination thereof, wherein the linear carbonate is present in an amount about 50 wt. % to about 80 wt. %, based on total weight of the electrolyte composition, wherein the FEC and the linear carbonate are present in a ratio of about 1:3 v/v to about 1:9 v/v;
vinylene carbonate present in an amount of about 1 wt. % to about 5 wt. %, based on total weight of the electrolyte composition; and
a fluorosilane additive selected from the group consisting of (3-cyanopropyl) dimethylfluorosilane, (2-cyanoethyl) dimethylfluorosilane, (4-cyanobutyl) dimethylfluorosilane, and a combination thereof.

6. The electrochemical cell of claim 5, wherein first electroactive material comprises silicon-containing particles having an average particle diameter of greater than or equal to about 1 μm, wherein the silicon-containing particles comprise silicon, carbon coated silicon, a silicon oxide, a lithium silicon alloy, a silicon tin alloy, a silicon iron alloy, a silicon aluminum alloy, a silicon cobalt alloy, or a combination thereof.

7. The electrochemical cell of claim 5, wherein the fluorosilane additive is present in an amount of about 1 wt. % to about 5 wt. %, based on total weight of the electrolyte.

8. The electrochemical cell of claim 5, wherein ethylene carbonate (EC) is not present in the electrolyte.

9. The electrochemical cell of claim 5, the negative electrode further comprises an electrically conductive material, wherein the electrically conductive material comprises carbon black, acetylene black, graphite, carbon nanotubes, carbon fibers, carbon nanofibers, graphene, graphene nanoplatelets, graphene oxide, nitrogen-doped carbon, a metallic powder, a liquid metal, a conductive polymer, or a combination thereof.

10. The electrochemical cell of claim 5, wherein the second electroactive material is selected from the group consisting of $Li_{(1+x)}Mn_2O_4$, where $0.1 \le x \le 1$; $LiMn_{(2-x)}Ni_xO_4$, where $0 \le x \le 0.5$; $LiCoO_2$; $Li(Ni_xMn_yCo_z)O_2$, where $0 \le x \le 1$, $0 \le y \le 1$, $0 \le z \le 1$, and $x+y+z=1$; $LiNi_{(1-x-y)}Co_xM_yO_2$, where $0<x<0.2$, $y<0.2$, and M is Al, Mg, or Ti; $LiFePO_4$, $LiMn_{2-x}Fe_xPO_4$, where $0<x<0.3$; $LiNiCoAlO_2$; $LIMPO_4$, where M is at least one of Fe, Ni, Co, and Mn; $Li(Ni_xMn_yCo_2Al_p)O_2$, where $0 \le x \le 1$, $0 \le y \le 1$, $0 \le z \le 1$, $0 \le P \le 1$, $x+y+z+p=1$ (NCMA); $LiNiMnCoO_2$; $Li_2FePO_4F$; $LiMn_2O_4$; $LiFeSiO_4$; $LiNi_{0.6}Mn_{0.2}Co_{0.2}O_2$ (NMC622), $LiMnO_2$ (LMO), activated carbon, sulfur, and a combination thereof.

11. The electrochemical cell of claim 5, wherein the electrochemical cell is a pouch cell.

* * * * *